United States Patent
Fehervari

(10) Patent No.: US 8,557,473 B2
(45) Date of Patent: Oct. 15, 2013

(54) FUEL CELL POLYMER ELECTROLYTE MEMBRANE

(75) Inventor: Agota F. Fehervari, Lexington, MA (US)

(73) Assignee: Bose Corporation, Framingham, MA (US)

( * ) Notice: Subject to any disclaimer, the term of this patent is extended or adjusted under 35 U.S.C. 154(b) by 1230 days.

(21) Appl. No.: 12/001,260

(22) Filed: Dec. 11, 2007

(65) Prior Publication Data
US 2009/0148744 A1    Jun. 11, 2009

(51) Int. Cl.
    *H01M 8/10*    (2006.01)
(52) U.S. Cl.
    USPC ........... 429/493; 429/400; 429/188; 429/303; 429/304; 429/306; 429/491; 429/492
(58) Field of Classification Search
    USPC ........... 429/33, 493, 400, 188, 303, 304, 306, 429/491, 492
    See application file for complete search history.

(56) References Cited

U.S. PATENT DOCUMENTS

| | | | |
|---|---|---|---|
| 5,173,373 A | 12/1992 | Ohsuga | |
| 5,468,574 A | 11/1995 | Ehrenberg et al. | |
| 5,679,482 A | 10/1997 | Ehrenberg et al. | |
| 6,140,418 A | 10/2000 | Yamashita et al. | |
| 6,187,464 B1 | 2/2001 | Yasumoto et al. | |
| 6,197,240 B1 | 3/2001 | Pinchuk | |
| 6,413,298 B1 * | 7/2002 | Wnek et al. | 95/52 |
| 6,579,948 B1 | 6/2003 | Tan et al. | |
| 6,840,969 B2 | 1/2005 | Kobayashi et al. | |
| 6,962,959 B2 * | 11/2005 | Kurano et al. | 525/326.1 |
| 7,179,860 B2 * | 2/2007 | Cao et al. | 524/575 |
| 7,531,262 B1 | 5/2009 | Simpson et al. | |
| 7,737,224 B2 * | 6/2010 | Willis et al. | 525/333.5 |
| 7,740,967 B2 * | 6/2010 | Oren et al. | 429/493 |
| 2003/0013000 A1 | 1/2003 | Kuroki | |
| 2003/0219640 A1 | 11/2003 | Nam et al. | |
| 2004/0220301 A1 | 11/2004 | Hattori et al. | |
| 2004/0253502 A1 | 12/2004 | Shibata et al. | |
| 2005/0014056 A1 | 1/2005 | Zuber et al. | |

(Continued)

FOREIGN PATENT DOCUMENTS

| | | |
|---|---|---|
| EP | 1852928 | 11/2007 |
| EP | 1986257 | 10/2008 |

(Continued)

OTHER PUBLICATIONS

International Search Report and Written Opinion dated Feb. 18, 2009 for PCT/US2008/082795.

(Continued)

*Primary Examiner* — Peter F Godenschwager
*Assistant Examiner* — Jane L Stanley
(74) *Attorney, Agent, or Firm* — Brian M. Dingman; Dingman IP Law, PC

(57) ABSTRACT

Crosslinked sulfonated triblock copolymers exhibit lower methanol permeability and good physical strength relative to the perfluorinated proton conductive membranes typically used in Direct Methanol Fuel Cells. Examples of triblock copolymers that can be used as fuel cell membranes include SEBS, SIBS, and SEPS. The chemically cross-linked and sulfonated SIBS, SEBS, and SEPS exhibit lower swelling and tolerate higher sulfonation levels than the un-cross-linked counterparts. These copolymers are easily sulfonated using known procedures and can be manufactured at a fraction of the cost of the typical perfluorinated proton conductive membranes.

27 Claims, 6 Drawing Sheets

(56) References Cited

U.S. PATENT DOCUMENTS

| | | | |
|---|---|---|---|
| 2005/0042489 A1* | 2/2005 | Fukuta et al. | 429/30 |
| 2005/0112442 A1 | 5/2005 | Wells et al. | |
| 2005/0187370 A1 | 8/2005 | McCullough et al. | |
| 2005/0215728 A1* | 9/2005 | Cao et al. | 525/342 |
| 2006/0199906 A1 | 9/2006 | Walton et al. | |
| 2006/0251858 A1 | 11/2006 | Thomas et al. | |
| 2008/0113244 A1* | 5/2008 | Yamashita et al. | 429/33 |
| 2010/0081029 A1* | 4/2010 | Fukuta et al. | 429/33 |
| 2010/0167159 A1* | 7/2010 | Ono et al. | 429/483 |

FOREIGN PATENT DOCUMENTS

| | | | |
|---|---|---|---|
| JP | 2007-258003 | | 10/2007 |
| WO | 03030289 | | 4/2003 |
| WO | WO 2006/068279 | * | 6/2006 |
| WO | WO 2007/094185 A1 | * | 8/2007 |

OTHER PUBLICATIONS

International Search Report and Written Opinion dated May 20, 2008 from International Application No. PCT/US2007/087078.

Tan, et al. "Degradation of Gasket Materials in a Simulated Fuel Cen Environment," FUELCELL 2006-97124, Proceedings of FUELCELL 2006, Jun. 1-21,2006, Irvine, CA.

International Preliminary Report on Patentability dated Jun. 24, 2010 for PCT/US2008/082795.

First Office Action issued in corresponding Japanese national phase filing, Application No. 2010-538015, filed Nov. 7, 2008.

Extended European search report dated Aug. 30, 2012 in corresponding European national phase filing, Application No. 07865496.9.

Deluca, N.W., et al., "Polymer Electrolyte Membranes for Direct Methanol Fuel Cell: A Review," J. Polymer Science.: Part B: Polymer Physics, vol. 44, pp. 2201-2225 (2006).

Elabd, Y.A., et al., "Triblock copolymer ionomer membranes Part I. Methanol and proton transport," J. Membrane Science, vol. 217, pp. 227-242 (2003).

Elabd, Y.A., et al.,"Triblock copolymer ionomer membranes Part II. Structure characterization and its effects on transport properties and direct methanol fuel cell performance," J. Membrane Science, vol. 231, pp. 181-1880 (2004).

Elabd,Y.A., et al.,"Sulfonation and characterization of poly(styrene-isobutylene-styrene) triblock copolymers at high ion-exchange capacities," Polymer, vol. 45, pp. 3037-3043 (2004).

Itsuno, S., et al., "Novel Method for Halomethylation of Cross-Linked Polystyrenes," J. Am. Chem. Soc., vol. 1990, No. 112, pp. 8187-8188 (1990).

Ning, F., "Synthesis of Amphiphilic Block-Graft Copolymers [Poly-(styrene-b-ethylene-co-butylene-b-styrene)-g-Poly(acrylic acid)] and Their Aggregation in Water," J. Polymer Sci. Part A: Polymer Chem., vol. 40, pp. 1253-1266 (2002).

Weiss, R.A., et al., "Block copolymer ionomers: 1. Synthesis and physical properties of sulphonated poly(styrene-ethylene/butylenes-styrene)," vol. 32, No. 10, pp. 1867-1874 (1991).

* cited by examiner

FUEL CELL POLYMER ELECTROLYTE MEMBRANE

BACKGROUND

This disclosure relates to fuel cells and polymer electrolyte membranes used in fuel cells.

FIG. 1 is a diagram illustrating a typical polymer electrolyte fuel cell. In FIG. 1, a membrane electrode assembly (MEA) 150 is supported by gasket 120 and sandwiched between a fuel delivery system 130 and an oxidizer delivery system 140. The MEA 150 includes a polymer electrolyte membrane (PEM) 155, an anode catalyst layer 153 on an anode surface of the PEM 155, an anode diffusion layer 151 covering the anode catalyst layer 153, a cathode catalyst layer 157 on a cathode surface of the PEM 155, and a cathode diffusion layer 159 covering the cathode catalyst layer 157.

The PEM is a proton-permeable, electrically non-conductive membrane that allows transport of protons through the PEM from the anode to the cathode while preventing electrons from passing through the PEM. An example of a PEM typically used in fuel cells is a perfluorosulfonic acid membrane such as sulfonated tetrafluoroethylene copolymer membranes available as Nafion® plastic membrane from E.I. Dupont de Nemours and Company of Wilmington, Del. The anode catalyst layer 153 includes a catalyst such as platinum for increasing the anode reaction rate. The anode diffusion layer 151 is typically a porous electrical conductor such as carbon paper or cloth that conducts electrons generated by the anode reaction from the anode catalyst layer 153 to an external load while allowing transport of anode reaction reactants and products between the anode catalyst layer 153 and fuel delivery system 120. The cathode catalyst layer 157 includes a catalyst such as platinum for increasing the cathode reaction rate. The cathode diffusion layer 159 is typically a porous electrical conductor such as carbon paper or cloth that conducts electrons from the external load to the cathode catalyst layer 157 while allowing transport of cathode reaction reactants and products between the cathode catalyst layer 157 and the oxidizer delivery system 140.

Fuel delivery system 130 delivers fuel to the anode catalyst layer 153 and removes reaction products, if any, from the anode. Fuel may be delivered to the anode catalyst layer 153 through a fuel plenum, not shown, or through fuel distribution channels 135. Fuel delivery system 130 may include a flow distributor that distributes the fuel evenly over the anode side of the MEA, a humidifier to control water content at the anode, and valves and pumps to control the flow of materials into and out of the anode. Typically, the humidifier, and pumps are housed external to the fuel cell but contribute to the overall portability of the fuel cell. In a hydrogen fuel cell, where the fuel is hydrogen, no reaction products, other than protons, are produced at the anode side. When the fuel is methanol, the methanol can either be converted to hydrogen using a reformer or can be applied directly to the anode. When methanol is fed directly to the anode, the fuel cell is called a direct methanol fuel cell (DMFC) and water must be supplied with the methanol to the anode catalyst layer at the anode. If sufficient water is not provided at the anode, the methanol may be incompletely oxidized to form reaction products such as formaldehyde or formic acid. The incomplete oxidation of the fuel reduces the energy generated by the fuel cell and decreases the efficiency of the fuel cell.

Oxidizer delivery system 140 delivers oxidizer via oxidizer delivery channel 145 to the cathode catalyst layer 157 and removes reaction products from the cathode. Oxidizer is generally oxygen and may be conveniently provided as air although pure oxygen or enriched air may be used as the oxidizer. Protons transported through the PEM from the anode recombine with the oxidizer at the cathode to produce water as a cathode reaction product. The water produced at the cathode may be supplied to the fuel delivery system in a DMFC. Oxidizer delivery system 140 may include a flow distributor that distributes the oxidizer over a cathode surface of the MEA, a humidifier, a water reservoir, and pumps, blowers, and valves to control the material flows to and from the cathode. Typically, the humidifier, reservoir, pumps, and valves are housed external to the fuel cell but contribute to the overall bulk of the fuel cell.

SUMMARY

Crosslinked sulfonated triblock copolymers exhibit lower methanol permeability and good physical strength relative to the perfluorinated proton conductive membranes typically used in Direct Methanol Fuel Cells. Examples of triblock copolymers that can be used as fuel cell membranes include SEBS, SIBS, and SEPS. The chemically cross-linked and sulfonated SIBS, SEBS, and SEPS exhibit lower swelling and tolerate higher sulfonation levels than the un-cross-linked counterparts. These copolymers are sulfonated using known procedures and can be manufactured at a lower cost than the typical perfluorinated proton conductive membranes.

One embodiment of the present invention is directed to a polymer electrolyte membrane comprising: a multi-block copolymer having an elastomeric block and a plastic block, wherein the plastic block is chemically cross-linked and sulfonated. In an aspect, the multi-block copolymer is a tri-block copolymer. In a further aspect, tri-block copolymer is SIBS. In another aspect, the tri-block copolymer is selected from group consisting of SIBS, SEBS, and SEPS. In an aspect, the plastic block comprises a polymer having an aromatic ring. In another aspect, the plastic block comprises a polymer of styrene. In an aspect, the membrane is at least 60% insoluble in an 85/15 (w/w) mixture of toluene and 1-hexanol. In a further aspect, the membrane is characterized by an IEC of at least 1.5 meq acid/g based on a 30 wt % styrene content of the multi-block copolymer. In a further aspect, the membrane is characterized by a swelling of less than 350% in water.

Another embodiment of the present invention is directed to a method of manufacturing a polymer electrolyte membrane comprising: providing a multi-block copolymer having an elastomeric block and a plastic block, the plastic block having an aromatic ring; cross-linking the plastic block; and sulfonating the plastic block. In an aspect, the method further comprises film casting the multi-block copolymer. In another aspect, the method further comprises halomethylating the aromatic ring on the plastic block. In a further aspect, the cross-linking step is performed before the sulfonating step. In a further aspect, the step of cross-linking includes adding a cross-linker to the multi-block copolymer. In a further aspect, the cross-linker is characterized by at least two end groups capable of reacting with the halomethyl group on the aromatic ring. In a further aspect, the cross-linker includes at least two amine end groups. In a further aspect, the cross-linker is selected from a group consisting of hexamethylene diamine, hexamethylene diamine carbamate, phenylene diamine, and hydroquinone. In a further aspect, the step of cross-linking further includes a heat treatment promoting the cross-linking reaction. In another aspect, the cross-linking step is performed simultaneously with the sulfonating step. In a further aspect, cross-linking and sulfonation uses a Lewis acid reagent. In a further aspect, the Lewis acid reagent is selected from a group consisting of acetyl sulfate and chlorosulfonic acid. In another aspect, the cross-linker is characterized by at least two end group capable of reacting with the aromatic ring. In a further aspect, the cross-linker is selected from a group consisting of formaldehyde, trioxane, α,α'-dichloroxylene, 1,4-dichloro-2-butene, poly(vinylbenzyl chloride) and adipoyl chloride. In a further aspect, a sulfonating agent is selected from a group consisting of acetyl sulfate and chlorosulfonic acid. In another aspect, the sulfonating step is performed before the cross-linking step. In a further aspect, the sulfonating step further includes adding chlorosulfonic acid to the multi-block copolymer and heat treating the multi-block copolymer. In a further aspect, the cross-linking step further includes adding hexamethylene diamine and triethylamine to the sulfonated multi-block copolymer and heat treating the sulfonated multi-block copolymer.

Another embodiment of the present invention is directed to a fuel cell comprising: a fuel delivery system; an oxidizer delivery system; and a membrane electrode assembly having a sulfonated, chemically cross-linked multi-block copolymer polymer electrolyte membrane.

DETAILED DESCRIPTION

Figure 1:
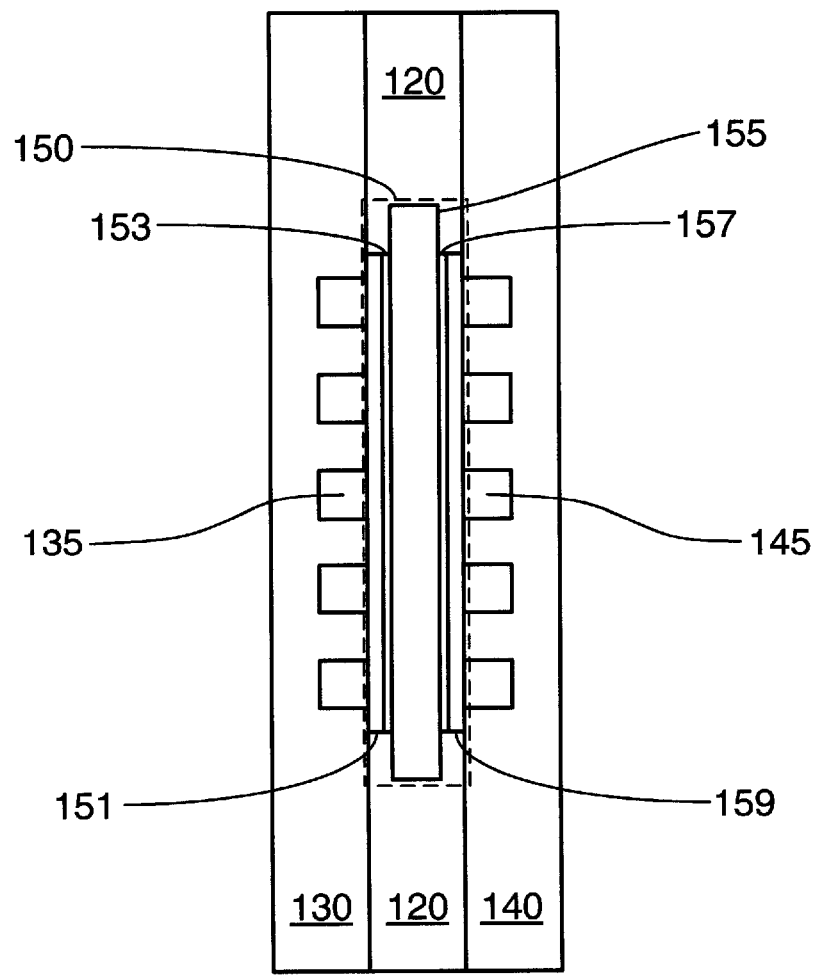
FIG. 1 is a diagram illustrating a typical polymer electrolyte fuel cell.

An important component of a direct methanol fuel cell (DMFC) is the polymer electrolyte membrane (PEM). The PEM separates an anode side of the fuel cell from a cathode side of the fuel cell while allowing protons to pass through the PEM from the anode to the cathode side. A sulfonated tetrafluorethylene copolymer is frequently used as a PEM for DMFCs. An example of such a copolymer is the Nafion® copolymer available from E. I. du Pont de Nemours and Company of Wilmington, Del. The Nafion® copolymer has a tetrafluorethylene backbone having branched perfluorovinyl ether groups terminated with sulfonated groups. Without being limiting, it is believed that the sulfonated end groups provide strongly acidic sites that conduct protons through the membrane while the fluorocarbon backbone provides thermal and chemical stability to the membrane. The Nafion® copolymer, however, exhibits methanol crossover, which decreases overall fuel cell efficiency and lifetime. In methanol crossover, methanol diffuses through the membrane from the anode to the cathode and competes with the cathode-side reaction of the fuel cell that effectively reduces the cathode potential and reduces the overall fuel cell efficiency.

In some embodiments, the PEM comprises a sulfonated, chemically cross-linked multi-block copolymer.

A multi-block copolymer comprises two or more blocks within a single polymer molecule. Each block comprises a polymerized monomer or a copolymer. The type of polymer comprising each block, as well as the length of each block, may be selected to optimize a desired characteristic of the multi-block copolymer such as, for example, strength, acid resistance, or creep resistance.

An example of a multi-block copolymer is an ABA block copolymer such as SIBS, which is a styrene-isobutylene-styrene block copolymer. The A block in SIBS is the styrene block and the B block is the isobutylene block. It should be understood that each block is a polymer of the identified monomer and the monomer name is used interchangeably with the polymer name. In SIBS, the B block is terminated at both ends by an A block.

Multi-block copolymers are not limited to only two block types as in SIBS tri-block copolymer. For example, an ABC block copolymer has two different end blocks, A and C. An ABCA block copolymer has the same end block but includes two different interior blocks, B and C. A di-block copolymer, AB, is the simplest example of a multi-block polymer. Other examples of multi-block copolymers include copolymers having linear, branched or star branched backbones as well as graft copolymers. Although the following description uses the SIBS as an exemplar block copolymer, the skilled artisan may apply these teachings to other multi-block copolymers, which is understood to be within the scope of the present invention.

In some embodiments, an elastomeric polymer is selected as the B block in a tri-block copolymer. An elastomeric polymer is characterized by a glass transition temperature, Tg, that is less than its use temperature. For a direct methanol fuel cell (DMFC), the use temperature is typically between 0-80° C. In this example, the B block is referred to as the elastomeric block. The A block in the block copolymer preferably has a Tg greater than the use temperature to provide strength via physical cross-linking of the A block. In this example, the A block is referred to as the plastic block.

The elastomeric polymer preferably has a carbon backbone that has little or no carbon double bonds in the backbone and more preferably a fully saturated backbone. Without being limiting, it is believed that the absence of carbon double bonds increases the acid resistance of the polymer chain. Examples of such acid resistant elastomeric polymers include hydrogenated butadiene, hydrogenated isoprene, hydrogenated chloroprene, and isobutylene. The elastomeric polymer may be a copolymer such as, for example, ethylene copolymers with α-olefins.

The plastic block may be polymers having an aromatic ring such as styrene or styrene derivatives such as, for example, α-methylstyrene, methylstyrene, chlorostyrene, hydroxystyrene, acetoxystyrene and vinylbenzyl chloride. Other examples of plastic block polymers include polymers of indene, vinylnaphthalene, vinylbiphenyl, diphenylethylene, vinylcarbazole, vinylpyridine, vinylpyridine derivatives such as, for example, vinylmethylpyridine, vinylbutylpyridine, vinylquinoline, and vinylacrydine. The plastic block may be a copolymer such as, for example, copolymers of styrene and styrene derivatives.

The elastomeric block is preferably immiscible with the plastic block. Without being limiting, it is believed that the immiscibility of the elastomeric and plastic blocks causes the multi-block copolymer to phase separate into plastic-rich regions and elastomeric-rich regions. The self-assembly of the multi-block copolymers into plastic regions and elastomeric regions is believed to occur on the scale of nanometers. Physical entanglement of the plastic blocks from different polymers within a plastic-rich region creates physical cross-linking of the multi-block copolymer that may increase the strength of the multi-block copolymer. Unlike vulcanization where a chemical bond is formed between polymers, physical entanglement of the plastic blocks does not require vulcanization aids that can leach out of the elastomer and affect the operation of the fuel cell. Furthermore, physical cross-linking is thermally reversible in contrast to vulcanization, which is thermally irreversible.

When the expected use temperature is near the Tg of the plastic block, chemical cross-linking within the plastic polymer block can increase the strength and creep resistance of the multi-block copolymer without appreciably affecting its elastomeric properties. As used hereinafter, cross-linking or chemical cross-linking refers to cross-linking via a chemical bond between two polymers and is distinguished from physical cross-linking arising from the entanglement of portions of two polymers caused, for example, by immiscible block phases.

Limiting chemical cross-linking to the plastic-rich regions can increase the strength and creep resistance of the membrane without significantly affecting the elastomeric properties of the membrane, which is dominated by the elastomeric block. For example, a plastic block comprising a copolymer of styrene and chloromethyl-styrene can increase the strength and creep resistance of the multi-block copolymer by chemically cross-linking the styrene/chloromethyl-styrene copolymer. A di-amine or multifunctional amine may be used to form a chemical bridge between a chloromethyl-styrene mer on one copolymer with a chloromethyl styrene mer on another copolymer. In another example, a copolymer of styrene and vinylpyridine may be chemically cross-linked using a di- or tri-halide or a di- or tri-epoxide to bridge across vinylpyridine on different copolymer molecules. In another example, a copolymer of a methacrylate derivative may be used as the plastic block copolymer wherein the copolymer is chemically cross-linked across methacrylate derivatives on different copolymer molecules. In another example, a plastic block of styrene may be converted to a copolymer via chloromethylation. The converted copolymer may then be chemically cross-linked using an appropriate cross-linking agent. In this example, the extent of cross-linking may be controlled by adjusting the reagents used in the chloromethylation or by adjusting the amount of cross-linking agent.

The elastomeric block may be the majority portion of the starting multi-block copolymer and can range between about 50 vol % and 95 vol % of the multi-block copolymer. The large fraction of the elastomeric block in the multi-block copolymer is believed to ensure that the morphology of the multi-block copolymer has a continuous elastomeric phase. Being the continuous majority fraction of the multi-block copolymer, the high corrosion resistance and low methanol permeability of the elastomeric block is substantially retained in the multi-block copolymer.

Multi-block copolymers may be manufactured using a living polymerization process and are available from various manufacturers. For example, a SIBS tri-block copolymer is also available under the SIBSTAR trade name from Kaneka Texas Corporation of Pasadena, Tex. Other examples of multi-block copolymer include a SEBS triblock copolymer available as Kraton G 1652 from Kraton Polymer LLC of Houston, Tex. or as Calprene H1670 from Dynasol of Mexico. Another example of a multi-block copolymer includes a SEPS triblock copolymer available as Kraton G 1730M from Kraton Polymers LLC of Houston Tex. Processing of the multi-block copolymer into a fuel cell PEM may use any of the methods known to one of skill in the art and include heating the multi-block copolymer above the Tg of the plastic block, injection molding or cast molding into a desired shape, and cooling the membrane below the Tg of the plastic block.

Figure 2:
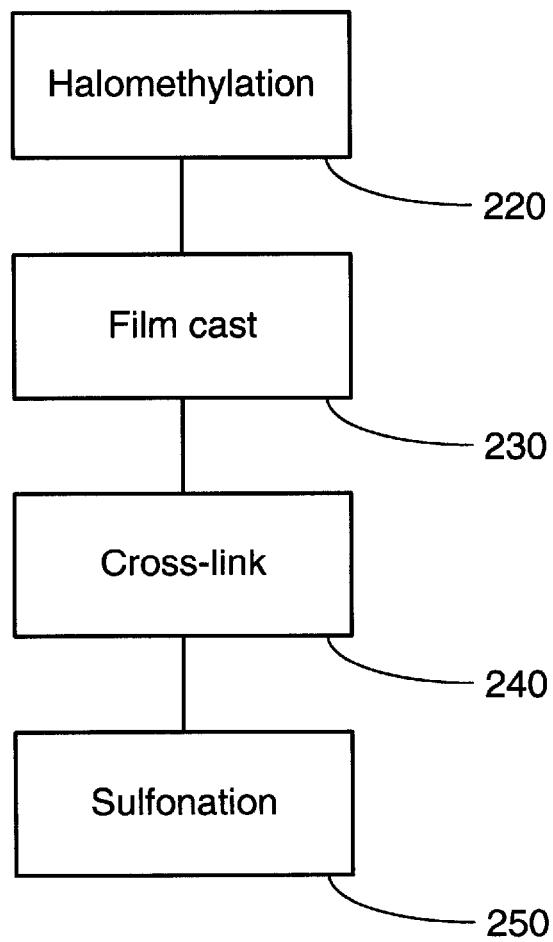
FIG. 2 is a flow chart illustrating an embodiment of the present invention.

FIG. 2 is a flow diagram illustrating a process for manufacturing a PEM. For illustrative purposes, a styrene-isobutylene-styrene tri-block copolymer (SIBS) is used as an exemplar copolymer but it should be understood that other multiblock copolymers may be used as PEMs by adopting the teachings of the present inventors. The triblock copolymer, such as SIBS, is halomethylated at 220 and cast into a mold at 230. The cast film is chemically cross-linked at 240 and sulfonated at 250 to produce a sulfonated, cross-linked PEM.

Halomethylation attaches a halomethyl group to the phenyl ring of the styrene mer. The halogen portion of the halomethyl group may be a halogen such as chlorine, bromine, or iodine. Without being limiting, it is believed that the attached halomethyl group can react with amines, alcohols, or thiols to form a cross-link with the halogen atom as the leaving group. Chloromethylation of the styrene units in the plastic blocks of a triblock copolymer follows a procedure described in Itsuno et al., "Novel Method for Halomethylation of Cross-Linked Polystyrenes," J. Am. Chem. Soc., vol. 1990, 112, 8187-8188 (1990), and in Ning et al., "Synthesis of Amphiphilic Block-Graft Copolymers [Poly(styrene-b-ethylene-co-butylene-b-styrene)-g-Poly(acrylic acid)] and Their Aggregation in Water," J. Polymer Science A, Vol. 40, 1253-1266 (2002), both of which are incorporated herein by reference. A solution of trioxane and chlorotrimethylsilane dissolved in chloroform is prepared. The triblock copolymer is added to the solution along with stannic chloride. The solution is stirred and maintained at 0° C. for 30 minutes. The solution is then stirred and maintained at room temperature for 2-6 hours depending on the degree of functionalization desired. The reaction is stopped by the addition of a 50/50 v/v methanol/water to the solution. The chloromethylated triblock copolymer is then purified by several dissolution/precipitation cycles with chloroform/methanol before being dried in vacuo. The degree of functionalization or the fraction of chloromethylated phenyl rings may be controlled by the amount of stannic chloride added to the solution and by the reaction time. Increasing the stannic chloride increases the degree of functionalization as does increasing the reaction time. In the examples below, chloromethylated triblock copolymers having between about 3-77% chloromethylation of styrene may be used to form a fuel cell membrane.

The chloromethylated SIBS copolymer may be cast from solution to a film that is allowed to slowly dry. Physical cross-linking arising from the immiscibility between the styrene portion and the isobutylene portion of the copolymer provides sufficient strength to form a coherent film during drying of the film.

The chloromethylated SIBS may be cross-linked by reacting a cross-linker molecule with the chloromethyl group on the phenyl rings of the styrene mer. The cross-linker molecule preferably has two or more reactive end groups that can react with the chloromethyl groups to form chemical cross-links between aromatic rings on different copolymers. Examples of multifunctional end groups that react with the chloromethyl group on the aromatic ring include amines, alcohols and thiols. A middle portion of the cross-linker may be selected for flexibility and acid resistance.

Examples of cross-linker molecules that may be used to cross-link the styrene block of a tri-block copolymer such as SIBS, SEBS, and SEPS include hexamethylene diamine, hexamethylene diamine carbamate, phenylene diamine, and hydroquinone. The cast film may be cross-linked by pouring a solution of cross-linker onto the film and allowing the film to dry. Alternatively, the cross-linker may be added to the polymer solution before casting and drying the film. Heat treatment between 40-80° C. for between 1-48 hours may be applied to the dried film to promote the cross-linking reaction. In some embodiments, the cross-linking heat treatment may be combined with the sulfonation heat treatment to allow simultaneous cross-linking and sulfonation.

The cross-linked film may be sulfonated by reacting an acetyl sulphate solution with the cross-linked film. Sulfonation of the cross-linked film follows a procedure similar to that described in R. A. Weiss et al., "Block copolymer ionomers: 1. Synthesis and physical properties of sulphonated poly(styrene-ethylene/butylene-styrene)," Polymer, Vol. 32, No. 10, pp 1867-1874 (1991), herein incorporated by reference. The acetyl sulphate solution is prepared by dissolving acetic anhydride in 1,2-dichloroethane followed by dropwise addition of $cCH_2SO_4$. The solution may be poured over the film and allowed to stand between 1 hour and 5 days before heat treatment between 40-80° C. for between 1-75 hours. The sulfonated membrane may be repeatedly washed with aliquots of deionized water until the pH of the water is around 5.

Figure 3:
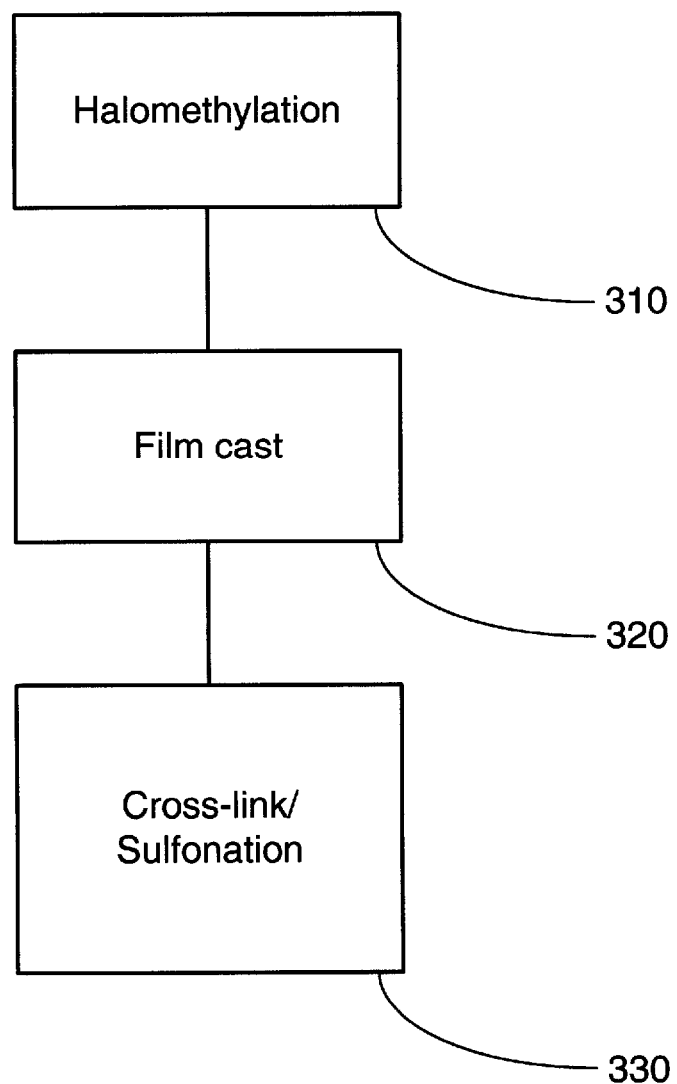
FIG. 3 is a flow chart illustrating another embodiment of the present invention.

FIG. 3 is a flow diagram illustrating another process for manufacturing a PEM. For illustrative purposes, a styrene-isobutylene-styrene tri-block copolymer (SIBS) is used as an exemplar copolymer but it should be understood that other multiblock copolymers may be used as PEMs by adopting the teachings of the present inventors. A SIBS copolymer is halomethylated at 310 and cast into a mold at 320 to form a film. The film is cross-linked and sulfonated at 330 by the addition of a Lewis acid reagent such as, for example, acetyl sulfate. Without being limiting, it is believed that the alkyl halide group attached to the phenyl ring of the styrene mer in the presence of a Lewis acid alkylates the phenyl ring that forms a chemical cross-link between phenyl rings on different copolymers. In some embodiments, the phenyl ring of the styrene mer is chloromethylated as described previously followed by casting into a mold. The cast film is allowed to slowly dry over 2-5 days. An acetyl sulfate solution is prepared by dissolving acetic anhydride in 1,2-dichloroethane and cooling the solution in an ice bath while adding $cCH_2SO_4$ dropwise to the cooled solution. The cooled acetyl sulfate solution is poured onto the film in the mold followed by a heat treatment to promote the cross-linking and sulfonation reactions. The heat treatment preferably is between about 40-80° C. and held between about 20-80 hours. The cross-linked sulfonated membrane is repeatedly washed with aliquots of deionized water until the pH of the water is around 5.

A halosulfonic acid, such as for example chlorosulfonic acid or fluorosulfonic acid, may be used to cross-link and sulfonated the cast SIBS film. Heat treatments to promote cross-linking and sulfonation may vary between 0° C. to about room temperature for between 3 hours to 30 hours.

Halomethylation of a block copolymer such as, for example, SIBS may be avoided in some embodiments. For example, a SIBS block copolymer may be dissolved in toluene or THF and a suitable amount of cross-linker added to the solution before casting into a mold. After allowing the film to slowly dry over a period of about 3-5 days, a sulfonating agent is poured over the dry film and allowed to react with the film. A heat treatment may be used to promote the sulfonation reaction. Cross-linking agents may be selected based on the ability of the end groups of the cross-linking agent to react with the aromatic ring of the plastic block polymer and may be, for example, formaldehyde, a formaldehyde precursor, a di- or multifunctional acid halide, a di- or multifunctional alkyl or aryl halide, or a divinyl compound. Examples of suitable cross-linkers include formaldehyde, trioxane, α,α'-dichloroxylene, divinylbenzene, 1,4-dichloro-2-butene, poly (vinylbenzyl chloride) and adipoyl chloride. The sulfonating agent may be, for example, acetyl sulfate and chlorosulfonic acid.

Halomethylation of a block copolymer such as SIBS may be substituted by a chlorosulfonation step that has the advantage of sulfonating the block copolymer. A SIBS copolymer may be chlorosulfonated by casting SIBS from toluene and adding a solution of chlorosulfonic acid in anhydrous chloroform to the dry film followed by mild heat treatment of the film. After the sulfonating solution is removed, the chlorosulfonated SIBS film may be cross-linked with hexamethylene diamine but the acidic conditions arising from the chlorosulfonated SIBS may require a co-agent such as triethylamine to prevent the hexamethylene diamine from forming a salt instead of forming a cross-link.

A solubility test may be used to characterize the efficacy of crosslinking in the membrane. In a solubility test, a portion of a membrane is immersed in a solvent that is known to be a good solvent for the un-crosslinked polymer. The portion is allowed to swell and/or dissolve over a predetermined time and temperature such as, for example, 24 hours at room temperature. After immersion, the undissolved portion is removed from the solution, dried and weighed to determine the weight of the insoluble polymer. The solution is dried and weighed to determine the weight of the soluble polymer. The insoluble fraction is weight of the insoluble polymer divided by the sum of the weight of the insoluble polymer and the soluble polymer.

The solubility test may be applied to sulfonated or unsulfonated membranes by selection of an appropriate solvent. For example, a mixture of 85 wt % % toluene and 15 wt % 1-hexanol is a good solvent for sulfonated SIBS, SEBS, and SEPS. For unsulfonated membranes, either toluene or THF may be used as a solvent. For sulfonated membranes, about 0.1 g of a sulfonated membrane is immersed in a mixture of 85 wt % toluene and 15 wt % 1-hexanol and allowed to swell/dissolve at room temperature overnight. The mixture is shaken before separating the insoluble polymer. The undissolved film is dried and weighed to determine the amount of insoluble polymer. The soluble phase is separately collected, dried and weighed to determine the amount of soluble polymer. The fraction of insoluble polymer is calculated as the weight of the insoluble polymer divided by the sum of the weight of the insoluble polymer and the weight of the soluble polymer. The fraction of insoluble polymer may be reported as a percentage. The insolubility of the sulfonated, cross-linked membranes ranged from about 60% to 100% with a majority of the membranes exhibiting insolubility values greater than about 85%. Membranes that were halomethylated prior to cross-linking tended to exhibit insolubility values greater than about 85%. Membranes that were not halomethylated prior to cross-linking exhibited a wider range of insolubility values from about 60% to 99.8%.

Swelling of a sulfonated membrane may be determined by immersing a sample of known weight, W1, in a solvent such as water or 64 wt % methanol in water at room temperature. After at least 30-60 minutes of immersion, the weight of the swollen sample, W2, is determined. Swelling is calculated by dividing W2 by W1 and may be reported as a percentage. Without being limiting, it is believed that the percentage swelling of a membrane is influenced by the degree of sulfonation as well as the degree of crosslinking in the membrane wherein swelling increases as the degree of sulfonation increases and swelling decreases as the degree of cross-linking increases. Following the above-described method, the swelling of Nafion was determined to be 120% in water and 185% in 64% methanol. Swelling of the sulfonated and crosslinked membranes ranged from about 120% to almost 1300% but even at high swelling, the cross-linked membranes did not appear to dissolve in water or form a gel. Chloromethylated SIBS tended to swell less than the directly cross-linked SIBS and generally exhibited swelling values below 350% with a majority below 250%.

Membrane conductivity values reported below were determined by a two-point, in-plane AC impedance measurement at 100 kHz on membranes swollen in deionized water at room temperature of about 23-24° C. Opposite ends of the swollen membrane are each clipped to 1"×1" platinum foils for electrical contact and placed between two glass microscope slides. AC impedance was measured using a CH Instrument 66A Electrochemical Workstation at frequencies ranging from 100 Hz to 100 kHz. The resistance, R ($\Omega$), at 100 kHz was recorded and used to calculate the conductivity of the membrane, $\delta$ (S/cm)=L/(Rab), where L is the length of the membrane strip between the opposing inside edges of the two platinum contact foils, a is the width of the membrane strip in cm, and b is the thickness of the membrane strip in cm. The conductivity of 7 mil thick Nafion membranes was measured following the above-described method and was determined to be around 0.095 S/cm.

Methanol permeability values reported below were determined in a mock test cell at 63° C. A 4 cm×4 cm membrane, framed by a sealing gasket is placed in the mock test cell in place of the membrane electrode assembly. One side of the membrane is exposed to a methanol solution that is replenished at a flow rate of about 1 ml/min. The opposite side of the membrane is flushed with a 100 ml/min air flow that removes the methanol solution permeating through the membrane. The permeant is condensed and collected in a trap chilled to −50° C. Collection times vary between 1.5-5 hours depending on the permeability of the tested membrane. The amount and composition of the collected permeant are recorded. The methanol solution may be a solution of 64% aqueous methanol that represents the stoichiometric composition of the anode reaction or may be a solution of 8% methanol that is more representative of a typical fuel cell concentration. The methanol permeability of a 7 mil thick Nafion membrane was measured following the above-described method at both a high methanol concentration of about 64% and a low concentration of about 8%. At a high methanol concentration, the methanol permeability was 6.33 g/hr with a permeant concentration of about 79% methanol. At the low methanol concentration, the methanol permeability was 0.63 g/hr with a permeant concentration of about 19% methanol.

A strong acid content of the sulfonated membranes reported below were determined by back titration with HCl. A portion of a membrane is vacuum dried to constant weight. The dried test portion is immersed in an aqueous NaOH solution of known amount and concentration, typically 20-30 ml and 0.02 N, and agitated overnight. The solution is back titrated with a 0.02 N aqueous HCl solution. Titration curves of the sulfonated and cross-linked block copolymers typically exhibit more than one equivalence point presumably due to the presence of basic or weak acidic functional groups such as, for example, amines and aliphatic sulfonic acids. Strong acids that are not titrated by HCl are calculated from the last equivalence point. The strong acid content of the membrane, also referred to as the ion exchange capacity (IEC) of the membrane, is expressed in milliequivalent of acid per gram of polymer (meq/g) and is given by IEC=0.02*(Vb−Va)/w, where Vb is the volume of the 0.02 N NaOH solution, Va is the volume of the 0.02 N HCl solution titrated, and w is the dried polymer weight. The IEC is expected to roughly scale as the styrene content of the block copolymer. For example, a SIBS copolymer with a 30 wt % styrene content is expected to have an IEC value about twice that of a SIBS copolymer having a 15 wt % styrene content for the same level of sulfonation and cross-linking. Therefore, the IEC values may be used to compare sulfonation levels of different copolymers by normalizing to a same styrene content. Following the above-described method, the IEC of Nafion was determined to be 0.909 meq/g.

EXAMPLE 1

A SIBSStar® 103T theremoplastic elastomer available from Kaneka Texas Corporation of Pasadena, Texas was chloromethylated such that the chloromethylated SIBS (ClMeSIBS) contained about 9.59% chloromethylated styrene. The starting SIBS copolymer had a styrene content of about 30 wt % and an Mw of about 130,000. After dissolving 1.102 g of the 9.59% ClMeSIBS in 8.8 g of toluene, a solution of 0.0173 g of hexamethylene diamine (HMDA) dissolved in 2 g of toluene was added to the ClMeSIBS solution, which was then cast on a 12.5 cm×12.5 cm Teflon coated aluminum mold. The film was slowly dried over a period of about five days. An acetyl sulfate solution was prepared by dissolving 5.269 g of acetic anhydride in 9 g of 1,2-dichloroethane while the solution was cooled in an ice bath. The acetic anhydride solution was agitated as 4.155 g of cCH$_2$SO$_4$ was dropwise added to the solution. The acetyl sulfate solution was poured on the film pre-chilled in the mold and maintained at 4° C. for 4.5 hours. The mold and film were heated to 60° C. and maintained at that temperature for 73.25 hours. After cooling the mold and film down to room temperature, the film was washed repeatedly with 100 ml aliquots of deionized water until the pH of the water was around 5. The film was dried and yielded a 1.385 g sulfonated, crosslinked SIBS membrane. The membrane exhibited a 203% swelling in water, a 222% swelling in a solution of 64% methanol in water, 93.7% insolubility, and a conductivity of 0.0336 S/cm. The methanol permeability of the membrane against a 64% methanol solution was 2.34 g/hr with a permeant concentration of about 68% methanol. The methanol permeability of the membrane against an 8% methanol solution was 0.25 g/hr with a permeant concentration of about 15% methanol. The IEC of the membrane was 1.93 meq acid/g.

EXAMPLE 2

Figure 4:
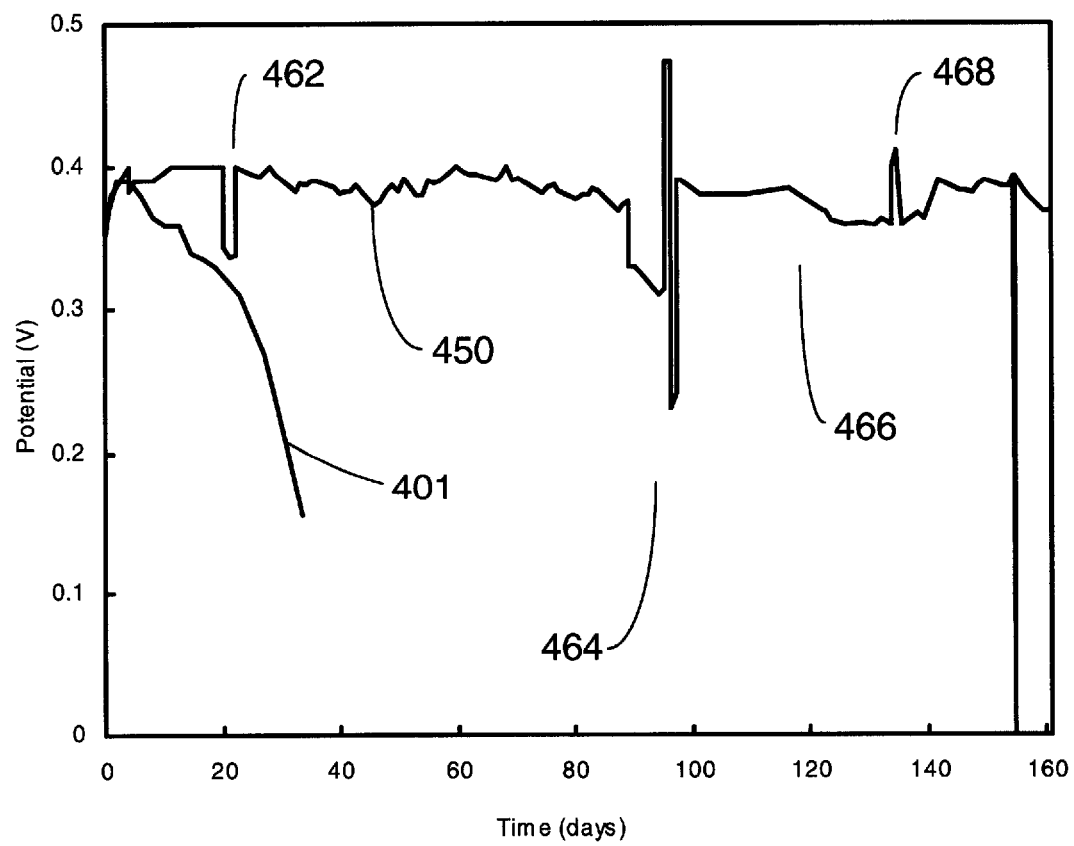
FIG. 4 is a graph showing the fuel cell potential as a function of time of an embodiment of the present invention.

The membrane of Example 1 was tested in a direct methanol fuel cell. The anode and cathode platinum loading of the membrane electrode assembly was about 2.8 and 1.9 mg/cm$^2$, respectively. The fuel cell test assembly was held at 63° C. under a 2 A load and used an 8% methanol/water fuel. FIG. 4 presents the fuel cell potential, in volts, as a function of time, in days, for the membrane of Example 1450 and a un-crosslinked sulfonated SIBS membrane 401. The un-crosslinked membrane 401 exhibited a decreasing potential and failed before 40 days. In contrast, the chemically crosslinked membrane did not exhibit a decreasing potential but remained substantially constant over the 160 day run. A dip in potential at around 20 days 462 reflects a change in load from 2 A to 3 A. Similarly, a spike in potential at around 135 days reflects a change in load from 2 A to 1 A. A V-I experiment was performed on the running cell at around 90 days 464 and a dry-out experiment was performed on the running cell at around 120 days 466. In both experiments, the potential recovered to its pre-experiment value after the completion of the experiments.

EXAMPLE 3

The starting SIBS of Example 1 was chloromethylated such that the chloromethylated SIBS (ClMeSIBS) contained about 77% chloromethylated styrene. After dissolving 1.4 g of the 77% ClMeSIBS in 16.9 g of toluene, aliquots of 0.5 g of this solution were mixed with 0.015 g of a dispersion of 0.0294 g of hexamethylene carbamate (HMDC) in 0.3 g of N-methylpyrrolidone (NMP). The mixture was cast on a Teflon mold and allowed to dry slowly. After drying, the films were heated for 15 hours at 60° C., followed by heating at 100° C. for one hour. Insoluble content of the dried film was about 97 wt % insoluble in chloroform. An acetyl sulfate solution was prepared by dissolving 0.65 g of acetic anhydride in 2 g of 1,2-dichloroethane. The acetic anhydride solution was cooled in an ice-bath and 0.42 g of $cCH_2SO_4$ was added dropwise to the solution while the solution was agitated. The films were immersed in the acetyl sulfate solution for 5 minutes at 0° C., then heated for 42 hours at 60° C. After cooling to room temperature, the films were repeatedly washed with aliquots of deionized water until the pH of the water reached 5. The films were dried to yield 0.075 g of sulfonated, crosslinked SIBS. The membrane exhibited a 200% swelling in water, a 260% swelling in a solution of 64% methanol in water, 97% insolubility, and a conductivity of 0.0037 S/cm.

EXAMPLE 4

The starting SIBS of Example 1 was chloromethylated following the method described above such that the chloromethylated SIBS (ClMeSIBS) contained about 61% chloromethylated styrene. A solution of 0.8 g of the chloromethylated SIBS in 10 g of tetrahydrofurane (THF) was combined with a solution of 0.07 g of phenylene diamine (PDA) dissolved in 2 g of THF. The combined mixture was cast on a 12.5×12.5 cm Teflon coated aluminum mold and the cast film was allowed to slowly dry over about two days. The dried film was heated in the mold for 7 hours at 60° C., followed by heating for 4.5 hours at 80° C. The insoluble content of the dried film was about 99 wt % insoluble in THF. An acetyl sulfate solution was prepared by dissolving 5.083 g of acetic anhydride in 5.86 g of 1,2-dichloroethane and cooling the solution in an ice bath. The acetic anhydride solution was agitated while 4.00 g of $cCH_2SO_4$ was added dropwise. The acetyl sulfate solution was poured on the film in the mold at room temperature followed by incubation at 60° C. for 65 hours. The film was cooled to room temperature and allowed to stand for 70 hours at room temperature before being washed repeatedly with 100 ml aliquots of deionized water until the pH of the water was around 5. The film was dried to yield 0.9005 g of sulfonated and crosslinked SIBS membrane. The membrane exhibited a 187% swelling in water, a 175% swelling in a solution of 64% methanol in water, 99.5% insolubility, and a conductivity of 0.0070 S/cm.

EXAMPLE 5

The starting SIBS of Example 1 was chloromethylated following the method described above such that the chloromethylated SIBS (ClMeSIBS) contained about 61% chloromethylated styrene. A solution of 0.514 g of the chloromethylated SIBS in 12.2 g of THF was combined with a solution of 0.0468 g of hydroquinone dissolved in 1.2 g of THF. The mixture was cast on a 10×10 cm Teflon coated aluminum mold and the cast film was allowed to slowly dry over about 3 days. After drying, the cast film was heated in the mold for 6.5 hours at 80° C. An acetyl sulfate solution was prepared by dissolving 4.096 g of acetic anhydride in 12.7 g of 1,2-dichloroethane and cooling the solution in an ice bath. The acetic anhydride solution was agitated while 3.05 g of $cCH_2SO_4$ was added dropwise. The acetyl sulfate solution was poured on the film in the mold and kept at room temperature for 43.5 hours followed by incubation at 60° C. for 75 hours. The film was allowed to cool down and stand at room temperature for 24 hours before washing repeatedly with 100 ml aliquots of deionized water until the pH of the water was around 5. The film was air dried to yield a 0.557 g membrane of sulfonated, crosslinked SIBS. The membrane exhibited a 183% swelling in water, a 191% swelling in a solution of 64% methanol in water, 99.1% insolubility in a mixture of 85 wt % toluene/15 wt % 1-hexanol, and a conductivity of 0.0144 S/cm.

EXAMPLE 6

After dissolving 1.0 g of SIBS (SIBStar® 103T) in 9.0 g of toluene, the solution was cast on a 10 cm×10 cm Teflon mold. The cast film was dried over about four days, then dried in a vacuum oven. A sulfonation solution was prepared by dissolving 0.900 g of chlorosulfonic acid in 2.19 g of anhydrous chloroform while cooling the sulfonation solution in an ice bath. The cold sulfonation solution was poured on the film in the mold held at 4° C. and allowed to react for 17 hours at 4° C. before removing the solution from the film. A cross-linking solution was prepared by dissolving 1.6 g of triethylamine and 0.0845 g of HDMA in 2.2 g of anhydrous chloroform while cooled in an ice bath. The cold crosslinking solution was poured on the film in the mold at 4° C. and the mold was allowed to warm to room temperature and react for 3.5 hours. The crosslinking reaction was quenched by adding about 30 g of crushed ice and allowing the ice to melt for one hour. The film was treated with 30 g of 1 M sulfuric acid solution at 80° C. for one hour. The film was washed three times with 50 ml of deionized water, boiled four times in 50 ml aliquots of deionized water for 30-60 minutes each, and washed with 50 ml aliquots of deionized water until the pH of the water was about 4.5. The film was dried and yielded a 1.123 g sulfonated and crosslinked SIBS membrane. The membrane exhibited a 564% swelling in water, a 497% swelling in a 64% methanol in water solution, was 78.8% insoluble in an 85/15 w/w toluene/1-hexanol solution, and exhibited a proton conductivity of 0.0201 S/cm. The methanol permeability of the 5 mil thick membrane against a 63% methanol solution was 7.97 g/hr with a permeant concentration of about 76% methanol.

EXAMPLE 7

After dissolving 1.01 g of SIBS (SIBStar® 103T thermoplastic elastomer available from Kaneka Texas Corporation of Pasadena, Tex.) in 9.0 g of THF, 0.1025 g of trioxane was added to the solution. The solution was cast on a 12.5×12.5 cm Teflon coated aluminum mold. The film was slowly dried over about 4 days. A second solution including 0.5855 g of chlorosulfonic acid dissolved in 12.0 g of 1,2-dichloroethane was prepared and cooled in an ice bath. The ice-cold second solution was poured on the film in the mold at 4° C. and allowed to react for 22.5 hours at 4° C. The second solution was poured off the film and the film was covered with crushed ice and allowed to stand for a few hours. After standing, the film was washed repeatedly with 100 ml aliquots of deionized water until the pH of the water was about 4.5. The film was dried to yield a 1.1493 g membrane of sulfonated, crosslinked SIBS. The membrane exhibited a 382% swelling in water, a 470% swelling in a solution of 64% methanol in water, 91.4% insolubility, and a conductivity of 0.0788 S/cm. The methanol permeability of the 4 mil thick membrane against a 63% methanol solution was 6.39 g/hr with a permeant concentration of about 81% methanol. The methanol permeability of the membrane against an 8.5% methanol solution was 0.45 g/hr with a permeant concentration of about 25% methanol. The IEC of the membrane was 1.85 meq acid/g.

EXAMPLE 8

After dissolving 0.653 g of SIBS (SIBStar® 103T) in 6.0 g of THF, 0.0655 g of trioxane was added to the solution. The solution was cast on a 10 cm×10 cm Teflon coated aluminum mold and the film was dried over three days. An acetyl sulfate solution was prepared by dissolving 4.405 g of acetic anhydride in 12.45 g of 1,2-dichloroethane. The solution was cooled in an ice bath. 3.323 g of $cCH_2SO_4$ was added by dropwise addition while the solution was agitated. The ice-cold acetyl sulfate solution was poured on the film in the mold at room temperature. The film was held at 60° C. for 72 hours before being cooled to room temperature and held at room temperature for three days. The film was washed repeatedly with 100 ml aliquots of deionized water until the pH of the water was about 5. The film cracked but was air dried to yield about 0.8067 g of sulfonated, crosslinked SIBS. The film exhibited a 758% swelling in water, a 701% swelling in a 64% methanol/water solution, and 99.4% insolubility, and a conductivity of 0.038 S/cm.

EXAMPLE 9

After dissolving 0.6764 g of SEBS (Kraton G 1652M) in 9.0 g of THF, 0.238 g of trioxane was added to the solution. The solution was cast on a 10 cm×10 cm Teflon mold and the cast film allowed to dry over about 5 days. A sulfonating solution was prepared by dissolving 0.5612 g of chlorosulfonic acid in 20 g of 1,2-dichloroethane while cooled in an ice bath. The solution was poured on the cast film in a mold held at 4° C. and allowed to react at 4° C. for 24 hours. The sulfonating solution was poured off of the cast film and the film was covered with about 50 g of crushed ice and the ice allowed to melt. The film was repeatedly washed with 100 ml aliquots of deionized water until the pH of the water was about 4.5. The film was dried and yielded a 0.8956 g sulfonated, crosslinked SEBS membrane. The film exhibited a 328% swelling in water, a 344% swelling in a 64% methanol/water solution, 79.4% insolubility, and a conductivity of 0.1022 S/cm. The IEC, based on the strong acid content, of the membrane was 1.66 meq/g.

EXAMPLE 10

After dissolving 0.940 g of SIBS (SIBStar® 103T) in 8.0 g of toluene, 0.15 g of dichloroxylene was added to the solution. The solution was cast on a 10 cm×10 cm Teflon coated aluminum mold and the film was dried over about four days, followed by drying in a vacuum oven. An acetyl sulfate solution was prepared by dissolving 2.653 g of acetic anhydride in 9.96 g of 1,2-dichloroethane while the solution was cooled in an ice bath. The acetic anhydride solution was agitated while 2.08 g of $cCH_2SO_4$ was added dropwise to the solution. The acetyl sulfate solution was poured on the film in the mold at room temperature and maintained at room temperature for 2.5 hours before being heated to 60° C. and held at that temperature for 73.5 hours. The film was cooled and repeatedly washed with 100 ml aliquots of deionized water until the pH of the water was about 5. The film was air dried and yielded 1.270 g of sulfonated, crosslinked SIBS. The film exhibited 333% swelling in water, 323% swelling in a 64% methanol water solution, and was 99.8% insoluble in an 85/15 w/w toluene/1-hexanol solution. Conductivity of the membrane swollen in deionized water was 0.086 S/cm. Methanol permeability of the 5 mil thick membrane against a 64% methanol solution was 7.97 g/hr with a permeant concentration of about 76% methanol. Methanol permeability of the membrane against an 8% methanol solution was 1.1 g/hr with a permeant concentration of about 14% methanol.

EXAMPLE 11

After dissolving 1.00 g of SIBS (SIBStar® 103T) in 10.5 g of toluene, 0.0775 g of poly(vinylbenzyl chloride) was added to the solution. The solution was cast on a 12.5 cm×12.5 cm Teflon coated aluminum mold and the film was dried over about 5 days. An acetyl sulfate solution was prepared by dissolving 2.633 g of acetic anhydride in 8.62 g of 1,2-dichloroethane while being cooled in an ice bath. The acetic anhydride solution was agitated while 1.99 g of $cCH_2SO_4$ was added dropwise to the solution. The acetyl sulfate solution was poured on the film in the mold and held at 4° C. for 4.5 hours. The mold was then heated to 60° C. and held at that temperature for 73.25 hours before cooling down. The film was repeatedly washed with 100 ml aliquots of deionized water until the pH of the water was about 5. The film was dried to yield a 1.336 g sulfonated crosslinked SIBS membrane. The membrane exhibited 789% swelling in water, 597% swelling in a 64% methanol water solution, and was 96.8% insoluble in an 85/15 w/w toluene/1-hexanol solution. Conductivity of the membrane swollen in deionized water was 0.0674 S/cm.

EXAMPLE 12

After dissolving 1.261 g of SIBS (SIBStar® 103T) in 11.0 g of toluene, 0.2114 g of adipoyl chloride was added to the solution. The solution was cast on a 12.5 cm×12.5 cm Teflon coated aluminum mold. The film was slowly dried over about 4 days. A second solution including 0.420 g of chlorosulfonic acid dissolved in 13.37 g of 1,2-dichloroethane was prepared and cooled in an ice bath. The ice-cold second solution was poured on the film in the mold held at 4° C. and allowed to react for 18.3 hours at 4° C. An additional aliquot of chilled 0.8325 g chlorosulfonic acid solution in 10.5 g of 1,2-dichloroethane was added to the film in the mold and reacted for an additional 27 hours. After the second solution was poured off the film, the film was washed repeatedly with 100 ml aliquots of deionized water until the pH of the water was about 5. The film was dried to yield a 1.5609 g membrane of sulfonated, cross-linked SIBS. The membrane exhibited a 709% swelling in water, a 789% swelling in a solution of 64% methanol in water, 84.7% insolubility, and a conductivity of 0.057 S/cm. The IEC of the membrane was 1.77 meq/g.

EXAMPLE 13

After dissolving 0.646 g of SEBS (Kraton G 1652M) in 9.0 g of THF, 0.180 g of adipoyl chloride was added to the solution. The solution was cast on a 10 cm×10 cm Teflon mold and the cast film allowed to dry over about 5 days. A sulfonating solution was prepared by dissolving 0.952 g of chlorosulfonic acid in 20 g of 1,2-dichloroethane while cooled in an ice bath. The solution was poured on the cast film in a mold held at 4° C. and allowed to react at 4° C. for 23.5 hours. The sulfonating solution was poured off of the cast film and the film was covered with about 50 g of crushed ice and the ice allowed to melt. The film was repeatedly washed with 100 ml aliquots of deionized water until the pH of the water was about 4.5. The film was dried and yielded a 0.877 g sulfonated, cross-linked SEBS membrane. The film exhibited a 547% swelling in water, a 451% swelling in 64% methanol/water solution, 96.5% insolubility, and a conductivity of 0.077 S/cm.

EXAMPLE 14

The starting SIBS of Example 1 was chloromethylated following the method described above such that the chloromethylated SIBS (ClMeSIBS) contained about 9.59% chloromethylated styrene. A solution of 1.0 g of the chloromethylated SIBS in 13.7 g of toluene was cast on a 12.5 cm×12.5 cm Teflon coated aluminum mold and the cast film was allowed to slowly dry over about 5 days. An acetyl sulfate solution was prepared by dissolving 3.181 g of acetic anhydride in 12.5 g of 1,2-dichloroethane while cooling the solution in an ice bath. The acetic anhydride solution was agitated while 2.468 g of $cCH_2SO_4$ was added dropwise. The acetyl sulfate solution was poured on the film in the mold and held for 1.5 hours at 4° C. before being allowed to warm to room temperature and held at room temperature for 2 hours. The cast film was then held at 60° C. for 71 hours before being allowed to cool to room temperature. The film was held at room temperature for three days before being repeatedly washed with 100 ml aliquots of deionized water until the pH of the water was around 5. The film was dried to yield a 1.277 g membrane of sulfonated and crosslinked SIBS. The membrane exhibited a 197% swelling in water, a 190% swelling in a solution of 64% methanol in water, 99.7% insolubility in 85 wt % toluene/15 wt % 1-hexanol, and a conductivity of 0.1028 S/cm. Methanol permeability of the 4 mil thick membrane against a 65% methanol solution was 4.18 g/hr with a permeant concentration of about 74% methanol. Methanol permeability of the membrane against an 8% methanol solution was 0.36 g/hr with a permeant concentration of about 19% methanol. The IEC of the membrane was 1.96 meq acid/g.

EXAMPLE 15

Figure 5:
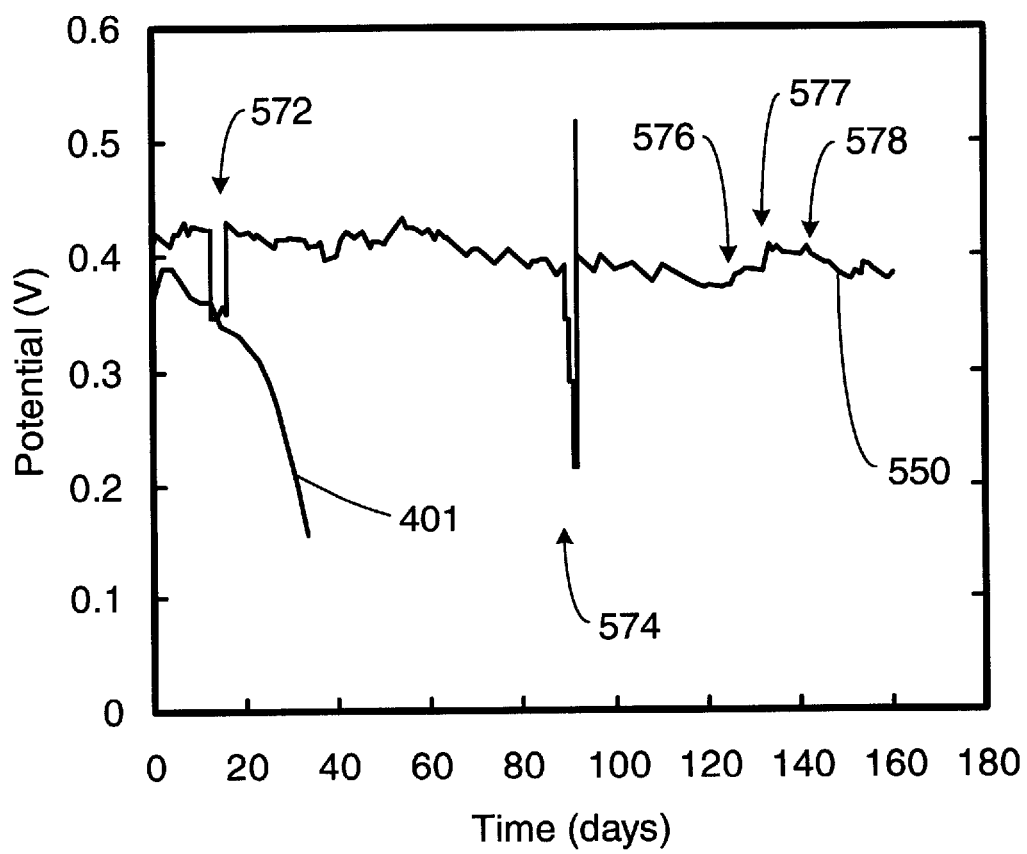
FIG. 5 is a graph showing the fuel cell potential as a function of time of another embodiment of the present invention.
Figure 6:
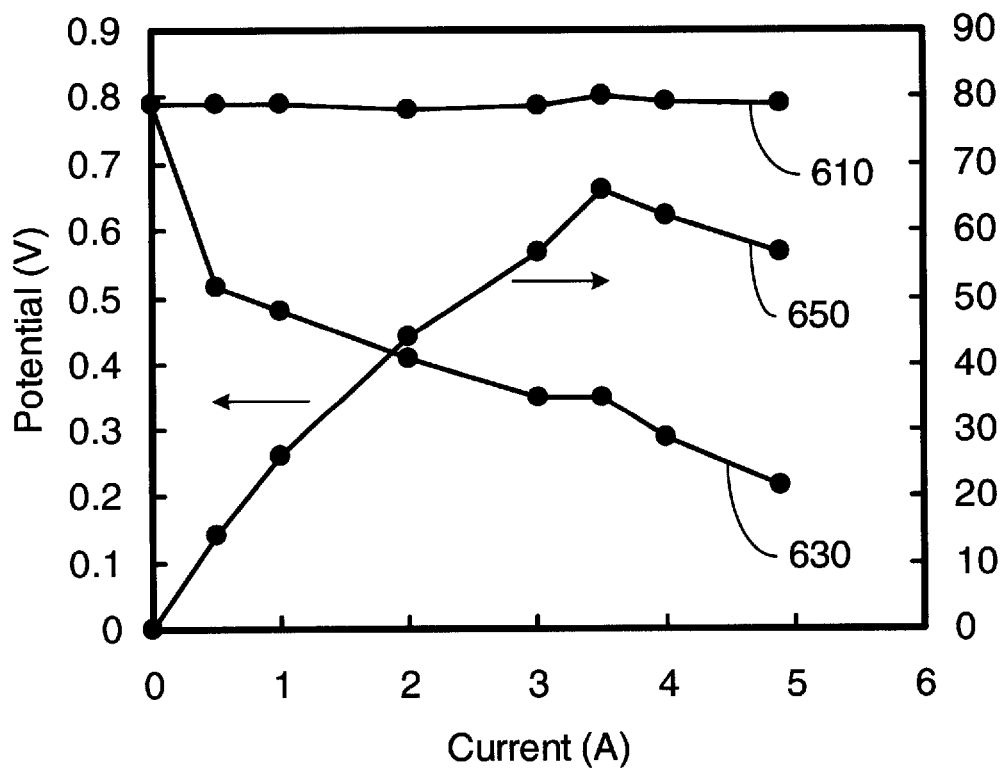
FIG. 6 is a graph showing the open cell potential, fuel cell potential, and fuel cell power density as a function of load current for the embodiment of FIG. 5.

The membrane of Example 14 was tested in a direct methanol fuel cell. The anode and cathode platinum loading of the membrane electrode assembly was about 2.9 and 1.9 mg/cm², respectively. The fuel cell test assembly was held at 63° C. and used an 8% methanol/water fuel. FIG. 5 shows the fuel cell potential under a 2A load for the membrane of Example 14 550 and for a sulfonated but un-crosslinked SIBS membrane 401. FIG. 5 indicates that the membrane of Example 14 maintained a fairly constant potential of about 0.4V for over the designed 160 days of fuel cell operation. In contrast, the cell potential of the sulfonated but un-crosslinked SIBS membrane decayed over time and failed before 40 days. During the operation of the fuel cell, various operating conditions were varied to gauge the ability of the fuel cell to recover from these transients. The load current was increased to 3.5 A after about 20 days of operation 572 during which the potential fell but recovered when the load current returned to 2 A. After about 90 days of operation 574, the fuel cell was run at various load currents to measure the V-I properties of the fuel cell. Between around 120 days and 140 days, the dry-out experiments where performed 576, 577, and 578 where the fuel cell was shut down and the membrane dried by draining and holding at room temperature 576, draining and flushing with dry nitrogen gas on both the anode and cathode side of the MEA 577, and draining, heating to 85° C., then cooling while flushing with dry nitrogen gas on both the anode and cathode side of the MEA 578. The fuel cell was refilled with fuel to rehydrate the dried membrane and MEA and then restarted. FIG. 5 indicates that the drying did not substantially affect the fuel cell performance and the fuel cell maintained a fairly constant potential of about 0.4 V until the operation was terminated at around 165 days. FIG. 6 shows the fuel cell potential in volts 630, the open circuit potential in volts 610, and the power density in mW/cm² 650 of the fuel cell as a function of load current. The measurements were taken after about 20 and 90 days of fuel cell operation and indicate a peak power density of about 65 mW/cm² at about 3.5 A.

EXAMPLE 16

A chloromethylated triblock copolymer of styrene end blocks and hydrogenated butadiene middle block (SEBS) was prepared following the procedure for cholomethylating SIBS. The triblock copolymer was a Kraton G 1652 styrene-b-ethylene/butylene-b-styrene triblock copolymer having 30 wt % styrene. The triblock copolymer was chloromethylated such that about 10.1% of the styrene units were chloromethylated. After dissolving 0.6532 g of the chloromethylated SEBS in 8.5 g of THF, the solution was cast on a 12.5 cm×12.5 cm Teflon coated aluminum mold and allowed to dry over about three days. An acetyl sulfate solution was prepared by dissolving 4.28 g of acetic anhydride in 10 g of 1,2-dichloroethane while being cooled in an ice bath. The acetic anhydride solution was agitated as 3.033 g of $cCH_2SO_4$ was added dropwise. The acetyl sulfate solution was poured on the film in the mold held at room temperature and allowed to stand for 20 minutes. The temperature of the film and mold was increased to 60° C. and maintained at that temperature for 73.5 hours. The film and mold were cooled to room temperature and held at room temperature for three days. The film was washed repeatedly with 100 ml aliquots of deionized water until the pH of the water was about 5. The film was air dried to yield a 0.7984 g sulfonated crosslinked SEBS membrane. The membrane exhibited 236% swelling in water, 238% swelling in a 64% methanol water solution, was 99.4% insoluble in an 85/15 w/w toluene/1-hexanol solution, and exhibited a proton conductivity of 0.0533 S/cm. Methanol permeability of the 2 mil thick membrane against a 64% methanol solution was 2.5 g/hr with a permeant concentration of about 66% methanol. Methanol permeability of the membrane against an 8% methanol solution was 0.24 g/hr with a permeant concentration of about 15% methanol. The IEC of the membrane was 1.61 meq acid/g.

EXAMPLE 17

A chloromethylated triblock copolymer of styrene end blocks and hydrogenated isoprene middle block (SEPS) was prepared following the procedure for cholomethylating SIBS. The triblock copolymer was a Kraton G 1730M styrene-b-ethylene/propylene-b-styrene triblock copolymer having 20 wt % styrene. The triblock copolymer was chloromethylated such that about 7.95% of the styrene units were chloromethylated. After dissolving 0.650 g of the chloromethylated SEPS in 8.5 g of THF, the solution was cast on a 12.5 cm×12.5 cm Teflon coated aluminum mold and allowed to dry over about three days. An acetyl sulfate solution was prepared following the procedure described in Example AF8130. The acetyl sulfate solution was poured on the film in the mold held at room temperature and allowed to stand for 20 minutes. The temperature of the film and mold was increased to 60° C. and maintained at that temperature for 73.5 hours. The film and mold were cooled to room temperature and held at room temperature for three days. The film was washed repeatedly with 100 ml aliquots of deionized water until the pH of the water was about 5. The film was air dried to yield a 0.7235 g sulfonated crosslinked SEPS membrane. The membrane exhibited 233% swelling in water, 242% swelling in a 64% methanol water solution, was 99.4% insoluble in an 85/15 w/w toluene/1-hexanol solution, and exhibited a proton conductivity of 0.0485 S/cm. Methanol permeability of the 2 mil thick membrane against a 65% methanol solution was 4.56 g/hr with a permeant concentration of about 75% methanol. Methanol permeability of the membrane against an 8% methanol solution was 0.36 g/hr with a permeant concentration of about 21% methanol. The IEC of the membrane was 1.19 meq acid/g.

EXAMPLE 18

The starting SIBS of Example 1 was chloromethylated following the method described above such that the chloromethylated SIBS (CIMeSIBS) contained about 11% chloromethylated styrene. A solution of 1.003 g of the chloromethylated SIBS in 11 g of toluene was cast on a 10 cm×120 cm Teflon coated aluminum mold and the cast film was allowed to slowly dry over about 4 days. An acid solution of 1.237 g of chlorosulfonic acid dissolved in 19.85 g of 1,2-dichloroethane was prepared in an ice bath. The acid solution was poured on top of the cast film held in a mold held at 4° C. and allowed to stand for 24 hours. The cast film and solution were allowed to warm to room temperature and held there for 3.75 hours. The cast film was removed from the acid solution and repeatedly washed with deionized water until the pH of the water was about 5. The film was dried to yield 1.317 g of sulfonated cross-linked SIBS membrane. The membrane exhibited 193% swelling in water, 192% swelling in a 64% methanol water solution, was 96.5% insoluble in an 85/15 w/w toluene/1-hexanol solution, and exhibited a conductivity of 0.0722 S/cm.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:
1. A fuel cell comprising:
a fuel delivery system;
an oxidizer delivery system;
a membrane electrode assembly having a sulfonated, chemically cross-linked proton-conductive, electrically non-conductive multi-block copolymer polymer electrolyte membrane, wherein the multi-block copolymer has an elastomeric block and plastic block where the plastic block is chemically cross-linked and sulfonated; and
wherein the cross-linking is preforming simultaneously with the sulfonated or the cross-linking is performed before the sulfonating.
2. The fuel cell of claim 1 wherein the multi-block copolymer is a tri-block copolymer.
3. The fuel cell of claim 2 wherein the tri-block copolymer is SIBS.
4. The fuel cell of claim 2 wherein the tri-block copolymer is selected from group consisting of SIBS, SEBS, and SEPS.
5. The fuel cell of claim 1 wherein the plastic block comprises a polymer having an aromatic ring.
6. The fuel cell of claim 1 wherein the plastic block comprises a polymer of styrene.

7. The fuel cell of claim 6 wherein the membrane is characterized by an IEC of at least 1.5 meq acid/g based on a 30 wt % styrene content of the multi-block copolymer.
8. The fuel cell of claim 7 wherein the membrane is characterized by a swelling of less than 350% in water.
9. The fuel cell of claim 1 wherein the membrane is at least 60% insoluble in an 85/15 (w/w) mixture of toluene and 1-hexanol.
10. A method of manufacturing the polymer electrolyte membrane of claim 1 comprising:
providing a multi-block copolymer having an elastomeric block and a plastic block, the plastic block having an aromatic ring;
cross-linking the plastic block; and
sulfonating the plastic block;
wherein the cross-linking is performed simultaneously with the sulfonating or the cross-linking is performed before the sulfonating.
11. The method of claim 10 further comprising film casting the multi-block copolymer.
12. The method of claim 10 further comprising halomethylating the aromatic ring on the plastic block.
13. The method of claim 12 wherein the cross-linking step is performed before the sulfonating step.
14. The method of claim 13 wherein the step of cross-linking includes adding a cross-linker to the multi-block copolymer.
15. The method of claim 14 wherein the cross-linker is characterized by at least two end groups capable of reacting with the halomethyl group on the aromatic ring.
16. The method of claim 14 wherein the cross-linker includes at least two amine end groups.
17. The method of claim 14 wherein the cross-linker is selected from a group consisting of hexamethylene diamine, hexamethylene diamine carbamate, phenylene diamine, and hydroquinone.
18. The method of claim 14 wherein the step of cross-linking further includes a heat treatment promoting the cross-linking reaction.
19. The method of claim 12 wherein the cross-linking step is performed simultaneously with the sulfonating step.
20. The method of claim 19 wherein cross-linking and sulfonation uses a Lewis acid reagent.
21. The method of claim 20 wherein the Lewis acid reagent is selected from a group consisting of acetyl sulfate and halosulfonic acid.
22. The method of claim 10 wherein the cross-linker is characterized by at least two end group capable of reacting with the aromatic ring.
23. The method of claim 22 wherein the cross-linker is selected from a group consisting of formaldehyde, trioxane, α,α'-dichloroxylene, divinylbenzene, 1,4-dichloro-2-butene, poly(vinylbenzyl chloride) and adipoyl chloride.
24. The method of claim 22 wherein a sulfonating agent is selected from a group consisting of acetyl sulfate and halosulfonic acid.
25. A fuel cell comprising:
a fuel delivery system;
an oxidizer delivery system;
a membrane electrode assembly having a sulfonated, chemically cross-linked proton-conductive, electrically non-conductive tri-block copolymer polymer electrolyte membrane, wherein the tri-block copolymer has an elastomeric block and a plastic block, wherein the plastic block is a styrene polymer that is chemically cross-linked and sulfonated;

wherein the cross-linkine takes place on the benzene ring of the styrene monomer units of the styrene polymer; and wherein the cross-linking is performed simultaneously with the sulfonating or the cross-linking is performed before the sulfonating.

26. The fuel cell of claim 25 wherein the tri-block copolymer is selected from group consisting of SIBS, SEBS, and SEPS.

27. The fuel cell of claim 26 wherein the membrane is at least 60% insoluble in an 85/15 (w/w) mixture of toluene and 1-hexanol, wherein the membrane is characterized by an IEC of at least 1.5 meq acid/g based on a 30 wt % styrene content of the multi-block copolymer, and wherein the membrane is characterized by a swelling of less than 350% in water.

* * * * *